(12) United States Patent
Verbo et al.

(10) Patent No.: US 6,186,050 B1
(45) Date of Patent: Feb. 13, 2001

(54) BRAKING DEVICE WITH SIMPLIFIED STRUT

(75) Inventors: Ulysse Verbo, Aulnay-SS-Bois; Cedric Leboisne, Paris, both of (FR)

(73) Assignee: Bosch Systemes de Freinage, Drancy (FR)

(*) Notice: Under 35 U.S.C. 154(b), the term of this patent shall be extended for 0 days.

(21) Appl. No.: 09/297,966

(22) PCT Filed: Apr. 15, 1999

(86) PCT No.: PCT/FR99/00884

§ 371 Date: May 11, 1999

§ 102(e) Date: May 11, 1999

(87) PCT Pub. No.: WO99/55568

PCT Pub. Date: Nov. 4, 1999

(30) Foreign Application Priority Data

Apr. 24, 1998 (FR) .................................................. 98 05116

(51) Int. Cl.[7] .................................................. B60T 13/567
(52) U.S. Cl. .................................................. 92/169.3
(58) Field of Search .................................. 92/169.2, 169.3, 92/169.4; 91/369.1, 369.2, 369.3, 369.4

(56) References Cited

U.S. PATENT DOCUMENTS

| | | | |
|---|---|---|---|
| 4,328,738 | 5/1982 | Hamamatsu | 92/169.3 X |
| 4,402,256 | 9/1983 | Ando | 91/369.2 |
| 4,418,611 | 12/1983 | Tateoka et al. | 91/369.2 |
| 4,617,858 | 10/1986 | Hachiro | 92/169.3 X |
| 4,690,034 | 9/1987 | Ando et al. | 91/369.3 |
| 5,410,880 | 5/1995 | Schluter | 92/169.3 X |
| 5,447,030 | 9/1995 | Wang et al. | 92/169.3 X |
| 5,878,650 | 3/1999 | Osterday et al. | 92/169.3 X |

*Primary Examiner*—John E. Ryznic
(74) *Attorney, Agent, or Firm*—Leo H. McCormick, Jr.; Warren Comstock

(57) ABSTRACT

A braking device having a pneumatic booster (2) having a rigid casing (3) defined by a front shell (31) and a rear shell (32). The interior of the rigid casing (3) being separated into a front chanber (33) and a rear chamber (34) by a movable partition (5). The booster (2) is reinforced by a strut (4) with a screw (40) which passes through the front shell (31), movable partition (5) and rear shell (32). The screw (40) has front end (41) and a rear end (42) separated from an intermediate cylindrical section (43). A sleeve (7) which extends from the rear shell (32) receives the second end (42) of the screw (40) and allows the screw (40) to axially slide with respect to the rear shell (32). A stop (61) on the intermediate section (43) prevents the second end (42) from projecting from the rear shell (32) until the first end (41) is rotated into engages the front shell (31) and threads on the second end engage corresponding threads on a support (1) to fix the booster (2) to the support (1).

8 Claims, 3 Drawing Sheets

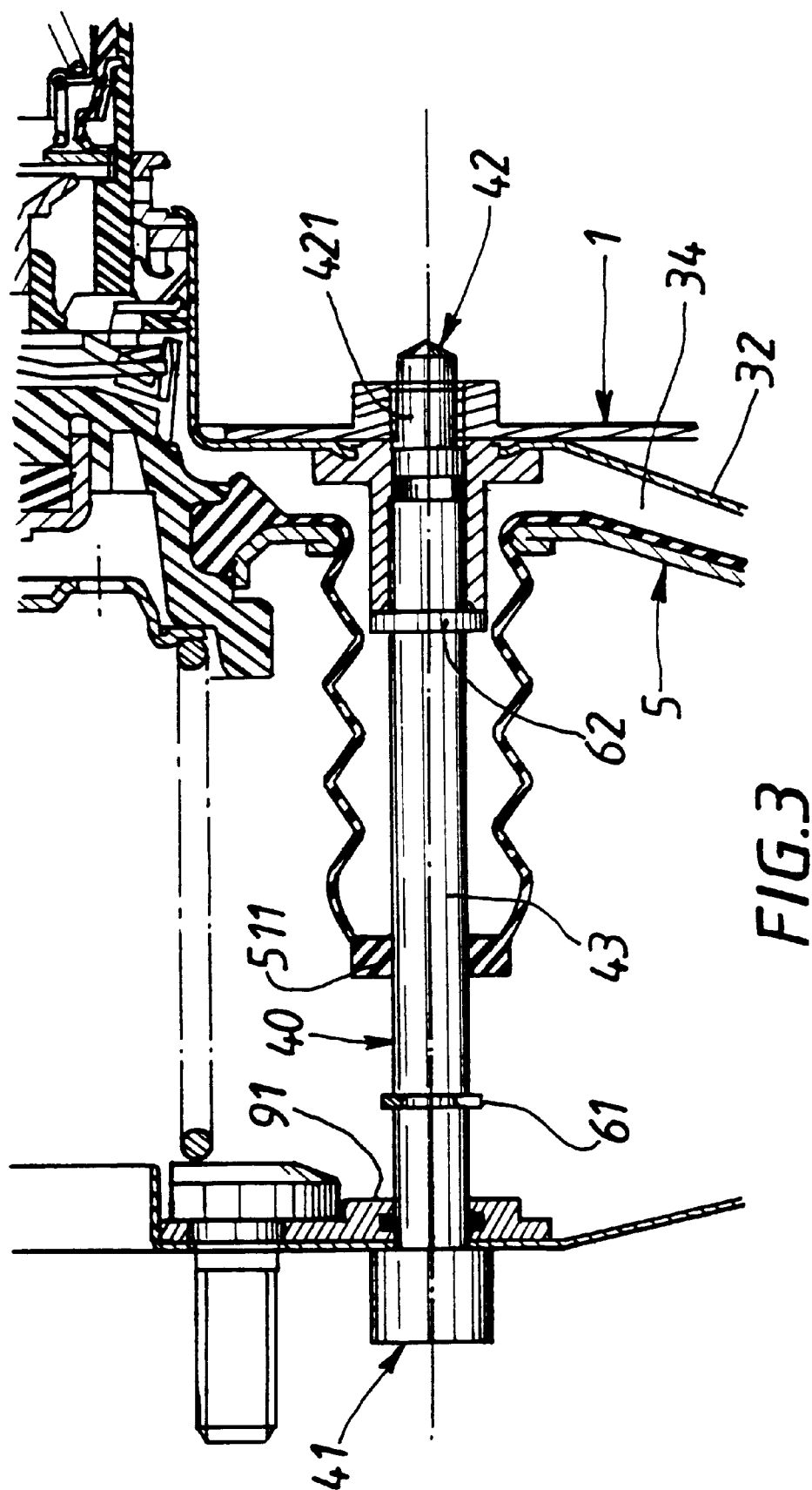

BRAKING DEVICE WITH SIMPLIFIED STRUT

The present invention relates to a braking device for a motor vehicle comprising an attachment support and a pneumatic brake-booster fixed when operational to the support, the booster itself comprising a rigid casing at least made of a front shell and of a rear shell which is adjacent to the support when operational, this casing being reinforced by at least one strut and delimiting an internal volume in which two chambers are separated from one another by means of a moving partition, the strut passing through the front shell, the moving partition and the rear shell and comprising a screw of which a rear end has a screw thread that can be screwed into the support, and of which a front end, which is outside the front shell, forms a tightening head capable of pressing against the front shell.

BACKGROUND OF THE INVENTION

Devices of this type are known from the prior art as illustrated, for example, by patent document EP-0,119,880.

In spite of its attraction, the embodiment illustrated in this prior document entails, so that the screw of the strut can be guided, the use of a tube which itself also forms an integral part of the strut.

SUMMARY OF THE INVENTION

The invention falls within this context and is intended to obviate this constraint.

To this end, the device of the invention, which in other respects is in accordance with the definition given in the above preamble, is essentially characterized in that the screw itself passes directly through the front shell, the moving partition and the rear shell and has, between its two ends an essentially cylindrical intermediate section, in that this intermediate section has a first stop which is inside the front shell and distant from the tightening head, in that the rear shell has a sleeve in which the rear end of the screw is engaged and can slide freely, in that the sleeve is of such a length that it can prevent the rear end of the screw from coming out of this sleeve, and in that the first stop is placed, along the intermediate section of the screw, in a position that allows the screw thread not to project from the sleeve until the booster is fixed to the support.

The intermediate section of the screw advantageously has a second stop intended to press against a front face of the sleeve when the screw is screwed into the support, the tightening head then coming to press against the front shell against which it exerts a predetermined compressive stress.

The device of the invention preferably further comprises a first seal for sealing the penetration through the front shell by the screw between the tightening head and the first stop, and a second seal for sealing the penetration through the sleeve by the screw between the second stop and the screw thread.

If the moving partition comprises a flexible diaphragm, this diaphragm may, for example, form a bellows surrounding part of the intermediate section of the screw and ending in a lip pressing in a sealed manner against this intermediate section.

Other features and advantages of the invention will emerge clearly from the description thereof given hereafter by way of non-limiting indication, with reference to the appended drawings.

BRIEF DESCRIPTION OF THE DRAWINGS

FIG. 3 is a view in part section of a device in accordance with the invention, seen after the booster has been attached to the support.

DETAILED DESCRIPTION OF THE INVENTION

Figure 1:
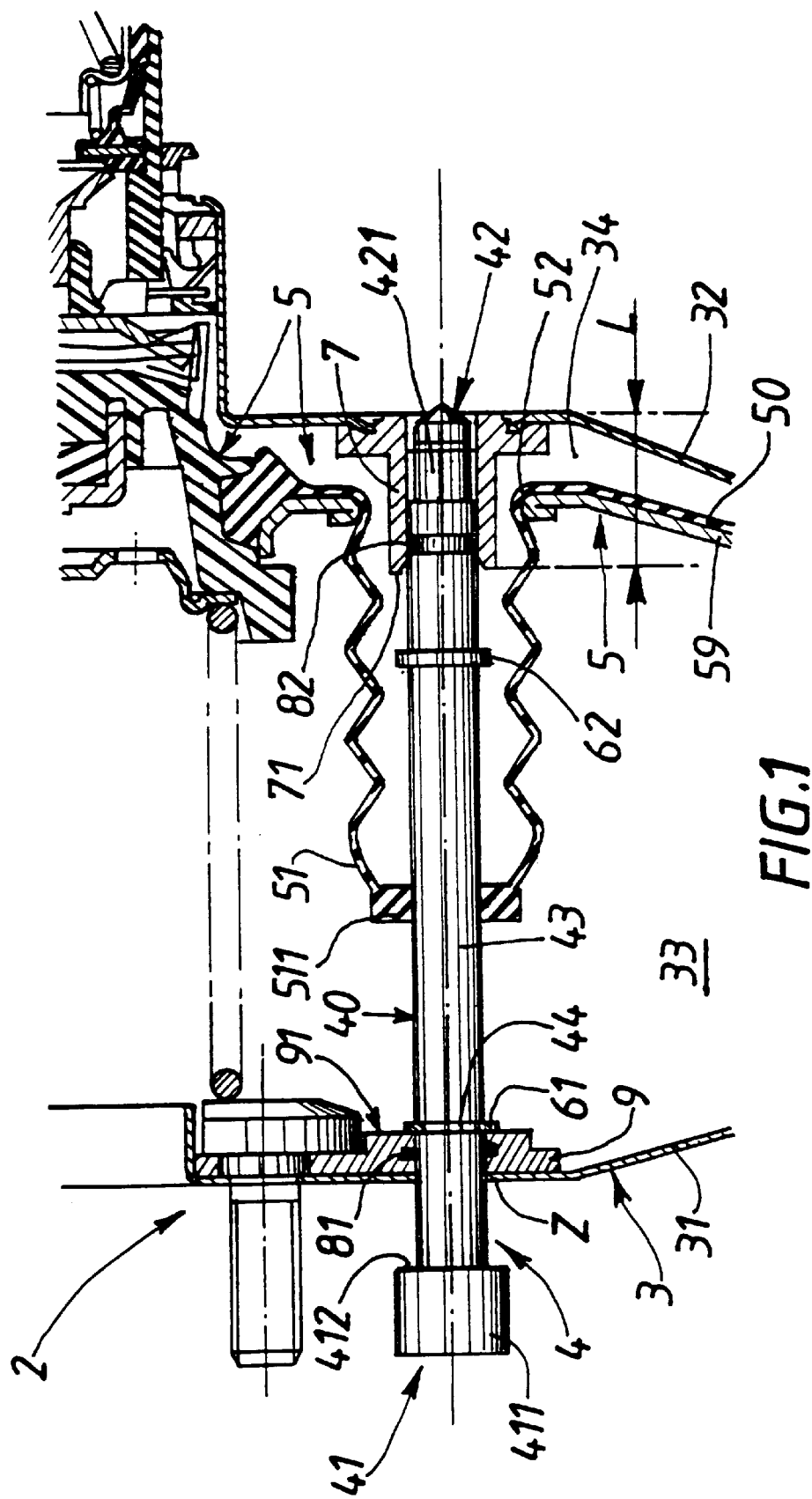
FIG. 1 is a view in part section of a device in accordance with the invention, seen prior to the attachment of the booster to the support.

As indicated earlier, the invention relates to a braking device for a motor vehicle, essentially comprising an attachment support 1 and a pneumatic brake-booster 2 fixed, when operational, to the support 1.

In so far as the aforementioned document EP-0,119,880 gives a full and detailed illustration of such a device, only those elements which are useful or necessary for an understanding of the subject matter and advantages of the present invention have been depicted in the drawings.

The booster 2 to which the invention applies itself comprises, in the known way, a rigid casing 3 generally made up of a front shell 31 and of a rear shell 32, the latter being adjacent to the support 1 when the booster is operational and fixed to the support 1.

The casing 3 is reinforced by one or more struts such as 4, and possibly by additional reinforcements such as the plate 9.

This casing 3 delimits an internal volume in which two chambers 33, 34 are separated from one another by means of a moving partition 5, which generally comprises a flexible diaphragm 50.

The strut 4 passes through the front shell 31, the moving partition 5 and the rear shell 32, and comprises a screw 40 of which a rear end 42 has a screw thread 421 that can be screwed into the support 1, and of which a front end 41, which is outside the front shell 31, forms a tightening head 411 capable of pressing on the front shell 31.

According to the invention, the screw 40 itself passes directly through the front shell 31, the moving partition 5 and the rear shell 32 and for this purpose has, between its two ends 41, 42 an essentially cylindrical intermediate section 43.

As shown by the figures, this intermediate section 43 has a front stop 61, arranged in the internal volume 33, 34 delimited by the casing 3, and distant from the tightening head 411.

For its part, the rear shell 32, has a rigid sleeve 7, for example crimped to the rear shell, and in which the rear end 42 of the screw 40 is engaged and free to slide.

Figure 2:
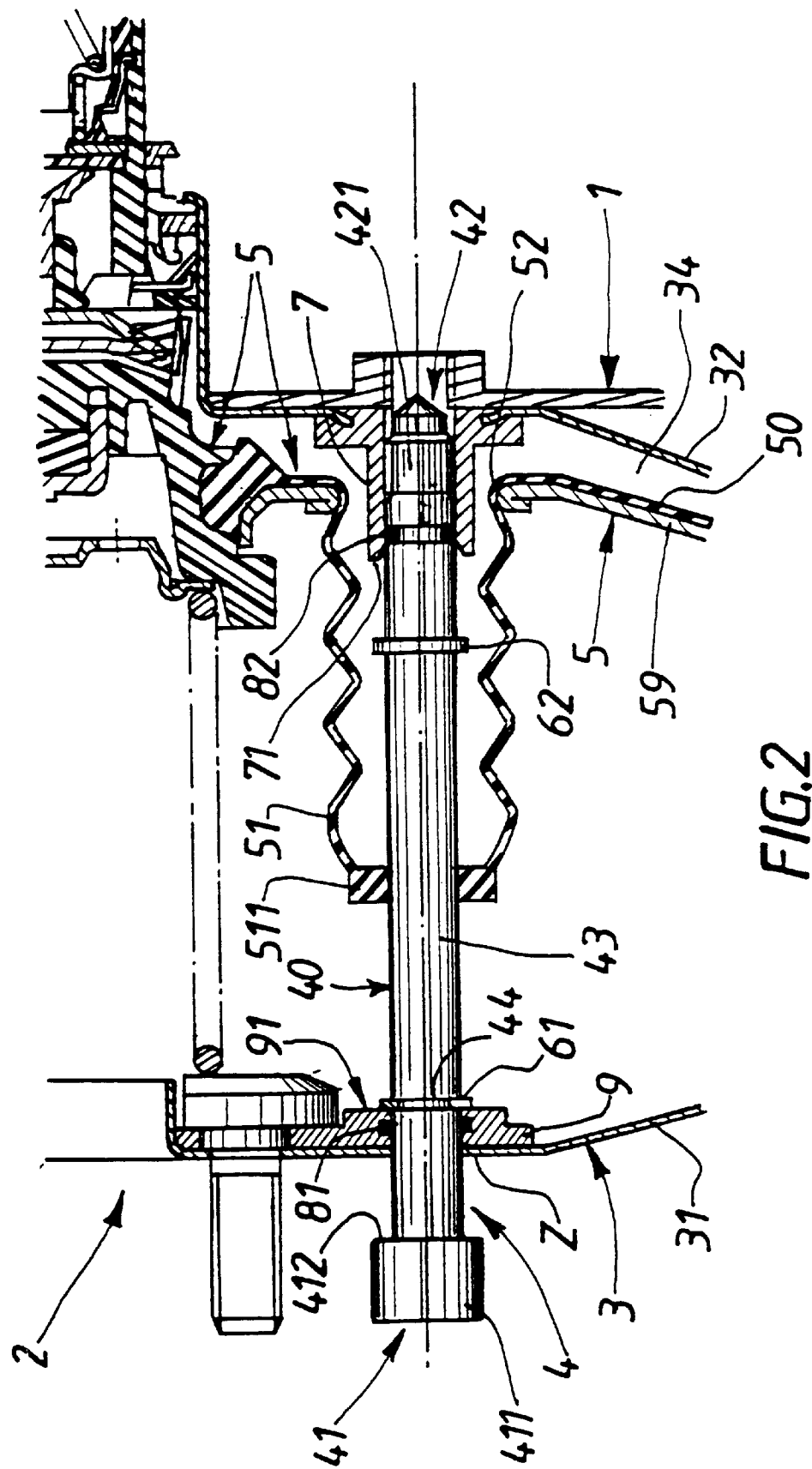
FIG. 2 is a view in part section of a device in accordance with the invention, seen at the instant that the booster is positioned on the support with a view to subsequent attachment.

The position of the front stop 61 on the intermediate section 43 of the screw is chosen, according to the length of the screw and the thickness of the booster, to be such that the screw thread 421 of the screw 40 cannot project from the sleeve 7, and therefore from the booster 2, until the latter is fixed to the support, as shown by FIGS. 1 and 2.

Once the position for the front stop 61 has been chosen, the sleeve 7 is given a length L such that the rear end 42 of the screw 40 cannot come out of the sleeve 7, in spite of the possibility accorded by the construction of the screw 40 of sliding with respect to the booster 2 as long as the latter is not fixed to the support 1.

A simple way of satisfying these conditions therefore consists, for example, in arranging the front stop 61 in such a way that when the screw 40 is pulled out of the casing 3 as far as it will go from the end which has its head 411, as shown by FIGS. 1 and 2, the rear end 42 of the screw lies flush with the rear shell 32 of the casing 3 and that the sleeve, when the screw is in this position, retains the rear end 42 of this screw.

In any case, the distance separating the front stop 62 from the rear end 42 of the screw, including the thickness of this stop 61, must be greater than the distance separating the front face 71 of the sleeve 7 from the land 91 where the front stop 61 presses against the inside of the front shell 31.

Furthermore, the distance separating the front stop 61 from the screw thread 421, including the thickness of this stop 61 and the length of the screw thread 421 must be at most equal to the distance separating the support 1 from the land 91 where the front stop 61 presses against the inside of the front shell 31.

As FIGS. 1 and 2 show, the front stop 61 consists, for example, of an elastic split ring which is inserted in a circular groove 44 of the intermediate section 43 of the screw 40 once the screw 40 has been engaged in the front shell 31, and before the front shell 31 and the rear shell 32 are crimped together or joined together by any other means.

The intermediate section 43 of the screw 40 may further comprise a second stop 62, for example formed of a circular rib of the screw 40, and intended to press against the front face 71 of the sleeve 7 when the screw 40 is screwed into the support 1, and thus limit the extent to which the screw 40 can be screwed in.

As a preference, the distance separating the second stop 62 from the internal land 412 of the tightening head 411, including the thickness of this stop 62 is less than the distance which, prior to the attachment of the booster, separates the front face 71 of the sleeve 7 from the zone Z of the front shell 31 against which the tightening head 411 presses, so that the tightening head 411 comes to press against the front shell 31 before the rear stop 62 comes to press against the front face 71 of the sleeve 7, the screw 40 thus exerting a predetermined compressive stress on the booster casing after it has been fixed to the support.

A first seal 81, for example housed in a groove in the reinforcing plate 9, is advantageously provided between the tightening head 411 and the first stop 61, so as to completely seal the penetration through the front shell 31 by the screw 40.

Likewise, a second seal 82, for example housed in a groove in the screw between the second stop 62 and the screw thread 421 and, when operational, closing off the sleeve 7, is preferably provided so as to completely seal the penetration through the sleeve 7 by the screw 40.

In the most common case in which the moving partition 5 comprises a flexible diaphragm 50 and a rigid skirt 59, this skirt is pierced with an orifice 52 to allow the screw 40 to pass, and the diaphragm 50 forms a bellows 51 which surrounds part of the intermediate section 43 of the screw 40 and which ends in a lip 511 pressing in a sealed manner against this intermediate section 43.

Of course, the device of the invention may comprise several screws such as the screw 40 illustrated in the figures and, in practice, will preferably compromise two screws of this type.

We claim:

1. A braking device for a motor vehicle comprising:
an attachment support;
a pneumatic brake-booster fixed to said support, said booster having a rigid casing with a front shell and of a rear shell, said rear shell being located adjacent to said support, said rigid casing being delimiting an internal volume, said internal volume being divided into a front chamber and a rear chamber by a moving partition; and
a strut means passing through said front shell, moving partition and said rear shell for reinforcing said rigid casing, said strut comprising at least a screw having rear end with a screw thread that is screwed into said support and a front end, said front end being located outside said front shell, said screw being characterised by directly passing through said front shell, moving partition and rear shell, said screw having an essentially cylindrical intermediate section located between said rear end and front end, said intermediate section having a first stop which is located inside said front shell and distant from said tightening head, said rear shell having a sleeve, said first stop being located along said intermediate section of said screw in a position that prevents said screw thread from projecting from the sleeve until said booster is fixed to said support.

2. The braking device according to claim 1, wherein said intermediate section of said screw includes a second stop which presses against a front face of said sleeve when said screw is screwed into said support, said tightening head presses against said front shell to exert a predetermined compressive stress.

3. The braking device according to claim 2 further including a first seal for sealing said front shell with respect to said screw between the tightening head and the first stop, and a second seal for sealing said sleeve with respect to said screw between the second stop and the screw thread.

4. The braking device according to claim 3, wherein said moving partition comprises a flexible diaphragm, said diaphragm forming bellows which surrounds a portion of said intermediate section of said screw and having a lip which presses in a sealed manner against said intermediate section.

5. The braking device according to claim 2, wherein said moving partition comprises a flexible diaphragm, said diaphragm forming bellows which surrounds a portion of said intermediate section of said screw and having a lip which presses in a sealed manner against said intermediate section.

6. The braking device according to claim 1, further including a first seal for sealing said front shell with respect to said screw between the tightening head and the first stop, and a second seal for sealing said sleeve with respect to said screw adjacent said rear end.

7. The braking device according to claim 6, wherein said moving partition comprises a flexible diaphragm, said diaphragm forming bellows which surrounds a portion of said intermediate section of said screw and having a lip which presses in a sealed manner against said intermediate section.

8. The braking device according to claim 1, wherein said moving partition comprises a flexible diaphragm, said diaphragm forming bellows which surrounds a portion of said intermediate section of said screw and having a lip which presses in a sealed manner against said intermediate section.

* * * * *